No. 727,486. Patented May 5, 1903.

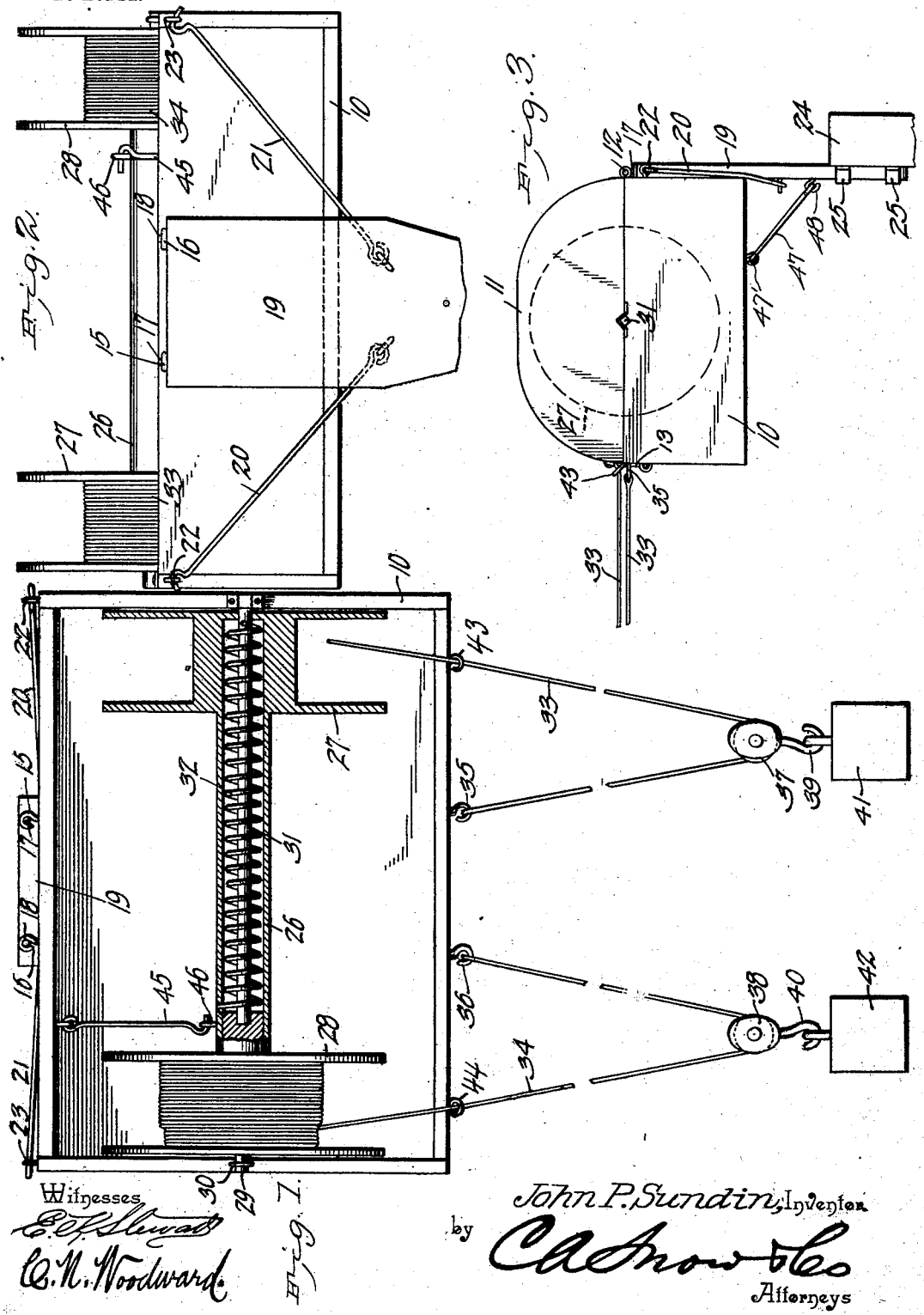

UNITED STATES PATENT OFFICE.

JOHN P. SUNDIN, OF WEST DULUTH, MINNESOTA.

CLOTHES-LINE REEL.

SPECIFICATION forming part of Letters Patent No. 727,486, dated May 5, 1903.

Application filed December 6, 1902. Serial No. 134,157. (No model.)

*To all whom it may concern:*

Be it known that I, JOHN P. SUNDIN, a citizen of the United States, residing at West Duluth, in the county of St. Louis and State of Minnesota, have invented a new and useful Clothes-Line Reel, of which the following is a specification.

This invention relates to clothes-line reels, and has for its object to provide a simply-constructed and easily-operated portable device in which the line or lines will be automatically wound up when not in use and from which they may be drawn to any required extent and the reel locked at any desired point to support lines of any required length; and the invention consists in certain novel features of construction, as hereinafter shown and described and specified in the accompanying claims.

In the drawings illustrative of the invention, in which corresponding parts are denoted by like designating characters, Figure 1 is a plan view of the apparatus, showing the top removed and the reel partly in section. Fig. 2 is a side elevation thereof, the top being open. Fig. 3 represents an end elevation of the apparatus.

The improved device comprises an inclosing casing 10 of any approved form and of any suitable material and provided with a cover member 11, preferably in arched form and movably connected to the member 10, as by hinges 12, and secured, as by catch 13, to render the contents of the casing readily accessible. The casing member 10 is provided with spaced eyes 15 16, with which spurs 17 18 on a bracket 19 are adapted to engage, and by which means this bracket is detachably connected to the casing, and it is further secured to the casing by bracing-hooks 20, 21, and 47, each movably connected by one end to the bracket and engaging eyes 22, 23, and 47' on the casing by their other ends, as shown in Figs. 2 and 3. These bracing-hooks securely fasten the bracket to the casing and hold the casing against accidental wabbling, so that it is necessary to use only one bracket to fasten the casing to its support. By this means the bracket is detachably secured to the casing. The bracket is designed to be connected detachably to a standard or post 24, as by clips or staples 25, to enable the casing and its contents to be readily removed and stored when not in use, and thus protect the device from the elements.

Within the casing 10 is rotatively mounted a drum 26, having reels 27 28 upon its opposite ends, one end of the drum having a central bearing-stud 29 extending therefrom and supported in a suitable bearing 30 upon the casing 10, as shown, while the other end of the drum loosely engages a shaft 31, attached rigidly to the opposite end of the casing and extending into the drum and fitting a bearing in the core of the drum at its opposite end. A spring 32 is coiled around the shaft 31 within the drum and connected by one end to the drum and by the other end to the shaft to provide for the automatic winding of the clothes-lines (indicated at 33 34) upon their respective reels 27 28. The outer end of the line 33 will be connected to the casing 10 at 35, and the outer end of the line 34 will be likewise connected to the casing at 36, the "bight" of the line 33 passing through a guide-pulley 37, and the bight of the line 34 passing through a guide-pulley 38, as shown, the guide-pulleys being provided, respectively, with hooks 39 40, by which they may be connected to posts 41 42 or other supports located at suitable points to provide the necessary length of line.

In practice the casing 10, with its attachments and contents, will be located at one side or end of the drying-yard and the posts at the opposite side to secure the longest possible length of line available for the clothes; but the parts of the device may be located any desired distance apart, as circumstances and the location where erected shall determine. Attached to the casing 10 is a movable hook 45, adapted to engage an eye 46 on the drum 26, by which the latter may be locked to the casing and limit the further outward movement of the lines 33 34. The lines 33 34 will be led through guiding-eyes 43 44 upon the casing to retain the proper position relative to the reels.

When the device is to be erected, the bracket member 19 is placed in position and the pulley members 37 38 carried to their respective posts 41 42 and connected thereto. The hook-catch 45 is then connected to the eye 46 upon the drum 26, which will "lock" the lines and prevent the weight of the clothes suspended therefrom from sagging the lines. When the clothes are removed, the hook 45 and the pulley members are detached, when the lines 33 34 will be automatically wound upon the drums by the reactionary force of the spring 32 drawing the pulleys 37 38 into close engagement with the casing, or the pulleys may be placed within the casing and the cover closed. The device can then be detached from the post 24 and stored until again required.

By this simple arrangement the clothes-lines will be exposed only while actually in use and thoroughly protected at all other times, thus greatly extending the time of their usefulness. The lines being wound up automatically, much valuable time is saved, no danger exists of the lines becoming entangled or mislaid, and they will be at all times ready for use.

The reels may be constructed of any desired size to hold any desired length or size of line, and any number of the reels may be employed upon one drum.

It is obvious that modifications in minor details may be made and the proportions and material employed varied without departing from the principle of the invention or sacrificing any of its advantages.

Having thus described my invention, what I claim is—

1. A clothes-line reel comprising an inclosing casing having spaced eyes extending therefrom, a bracket member having spaced spurs engaging said eyes, brace-hooks detachably connecting said bracket to said casing, means for detachably connecting said bracket to a support, a reel mounted in said casing, and a clothes-line wound on said reel.

2. A clothes-line reel comprising an inclosing casing having spaced eyes extending therefrom, a bracket member having spaced spurs engaging said eyes, brace-hooks detachably connecting said bracket to said casing, means for detachably connecting said bracket to a stationary support, one or more reels rotatively mounted in said casing, a spring disposed to forcibly wind said reels in one direction, clothes-lines connected by one end to said reels and by the other ends to said casing, guide-pulleys movably engaging said lines intermediately thereof, and means for detachably connecting said pulleys to a support positioned from said casing, substantially as described.

In testimony that I claim the foregoing as my own I have hereto affixed my signature in the presence of two witnesses.

JOHN P. SUNDIN.

Witnesses:
J. J. FREY,
ANDREW J. BORGSTROM.